United States Patent [19]
Johnson et al.

[11] 3,887,322
[45] June 3, 1975

[54] EXTRUDER DIE FOR MULTIPLE STREAM EXTRUSION

[75] Inventors: Keith G. Johnson, Pittsburgh; Anthony Paul Limbach, Downingtown, both of Pa.

[73] Assignee: Arco Polymers, Inc., Glenolden, Pa.

[22] Filed: Nov. 28, 1973

[21] Appl. No.: 419,812

[52] U.S. Cl................................. 425/466; 425/467
[51] Int. Cl............................................... B29f 3/04
[58] Field of Search..... 264/176 R, 177 R; 425/461, 425/464, 466, 467, 376, 380, 381, 382

[56] References Cited
UNITED STATES PATENTS
3,461,501  8/1969  Stewart............................ 425/381 X
3,474,495  10/1969  Deutsch et al.................. 425/381 X FOREIGN PATENTS OR APPLICATIONS
1,210,544  2/1966  Germany............................ 425/466

Primary Examiner—Robert D. Baldwin
Assistant Examiner—Mark Rosenbaum
Attorney, Agent, or Firm—Lewis J. Young

[57] ABSTRACT

An extrusion die for producing a plurality of streams of extrudate in a single horizontal row has been developed. A slot die for extruding flat sheet has been adapted by inserting adjustable width flow-dividers into the slot to produce multiple streams of extrudate.

2 Claims, 8 Drawing Figures

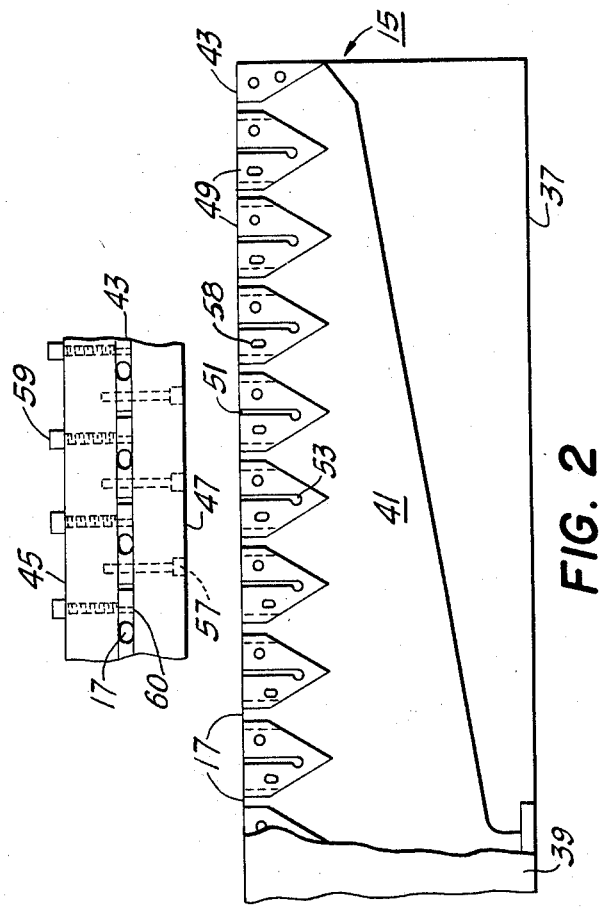
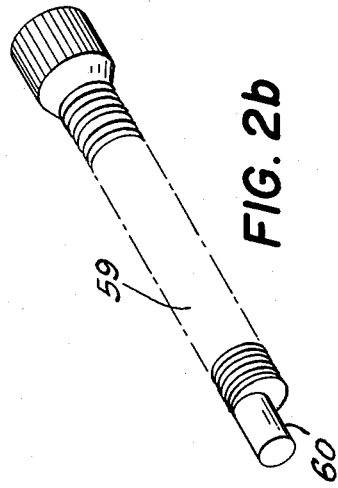
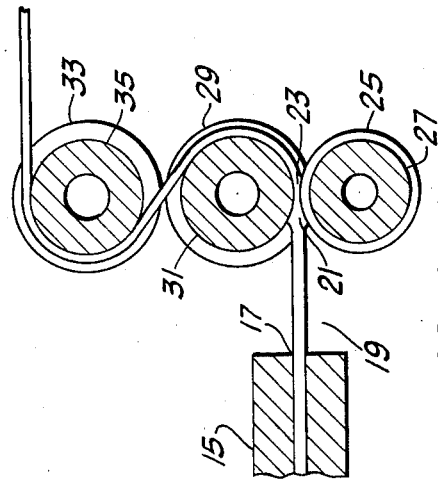
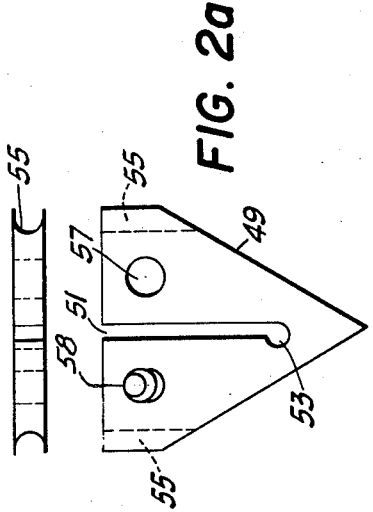

EXTRUDER DIE FOR MULTIPLE STREAM EXTRUSION

BACKGROUND OF THE INVENTION

In an application, Ser. No. 419,811, filed Nov. 28, 1973, one of us has described a method and apparatus for making thin-section, structural foam profiles by drawing partially expanded polymer through a chilled, moving shaping die. The method of application Ser. No. 419,811, was adapted to the extrusion and shaping of a single strand of extrudate. Unfortunately, even a small extruder has a pumping capacity greater than the capacity of the single strand shaping roll arrangement. Processing economics, therefore, dictates that multiple streams of product profile must be produced simultaneously. A process for extruding multiple streams has been described in our copending application Ser. No. 419,785 filed Nov. 28, 1973. A novel roll system for shaping the multiple streams has been described in our copending application Ser. No. 419,786 filed Nov. 28, 1973, now U.S. Pat. No. 3,857,664.

SUMMARY OF THE INVENTION

It has now been found that a plurality of structural foam profiles may be made simultaneously by conveying partially expanded thermoplastic material through chilled shaping passages which move at the same speed as the moving profiles, thereby eliminating any friction between the surfaces of the profiles and the passages and preventing scoring of the surface of the profiles. An extruder die, capable of furnishing multiple streams of extrudate has been developed. A roll forming apparatus has been developed to simultaneously shape the profiles by conveying the extrudates through confined passages formed when projections on one cooled roll intermesh with grooves on an adjacent cooled roll. The surface layers of the profiles are chilled by the cool rolls during the forming process while the cores of the profiles are still expanding. The pressure developed by the expanding foaming agent in the core of the profiles against the cooled surface layer forms a dense skin on the profiles. Thus, profiles having a dense skin and a foamed core are formed.

BRIEF DESCRIPTION OF THE DRAWINGS

FIG. 1 is a schematic view of the method and apparatus in accordance with the invention.

FIG. 2 is a partially cutaway elevational view and side view of the multiport die used in the method of FIG. 1.

FIG. 2a is an elevation and top view of a flow-divider used in the die of FIG. 2.

FIG. 2b is an isometric view of a dual action cam bolt used to adjust the width of the flow-divider of FIG. 2a.

DETAILED DESCRIPTION OF THE INVENTION

FIG. 1 illustrates the method of making multiple strands of extrudante having a dense skin and a foamed core. A screw type extruder (not show) provides the source of molten, expandable material. The extruder is provided with the usual extruder heating means (not shown) to soften the thermoplastic material to allow even flow of the material through the die. The extruder forces the material under pressure through the multi-orifice die, 15, to provide a plurality of streams of extrudate.

In a position spaced beyond the discharge orifice of the die, is a sizing roll arrangement supported by a stand (not shown). The first roll, 27, has a plurality of projections, 25, which are rectangular in the FIG. 3. The projections may have any desired shape to provide the desired cross-section to the sizing passage. A second roll, 29, has a plurality of grooves, 31, which are also rectangular in the figure. The grooves may also have any desired shape to provide the desired cross-section to the sizing passage. Rolls 27 and 29 are mounted in the support stand adjacent to one another and aligned so that the projections, 25 intermesh with the grooves, 31, to form a plurality of sizing passages, 23. A third roll, 33, is provided with a plurality of grooves, 35, which are also shown as rectangular and are identical in size and shape with the grooves, 31, in roll 29. In an embodiment having projections, 25, of shape other than rectangular, the grooves 35, in roll 33 must conform to the shape of the projections 25 in order to allow efficient cooling of the side of the extrudates adjacent the roll 33. Roll 33 is shown mounted directly above roll 29 so that the three rolls are all in a vertical line. In this position, maximum cooling of the sized extrudates is possible. Roll 33 is adjustable to any position with the relation to roll 29, from vertically above to horizontally beside. The grooves, 35, in roll 33 must be aligned with the grooves, 31, in roll 29. The rolls, 27, 29 and 33 are all internally cooled and driven by means not shown so that the peripheral speed is the same on all three rolls.

Figure 3A:
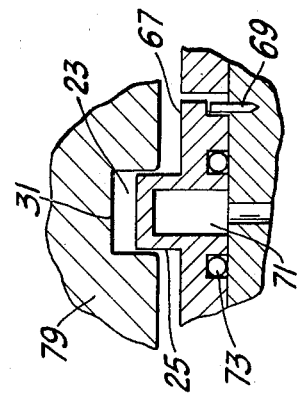
FIG. 3a is an enlarged section of one of the confined shaping passages of FIG. 3.
Figure 3:
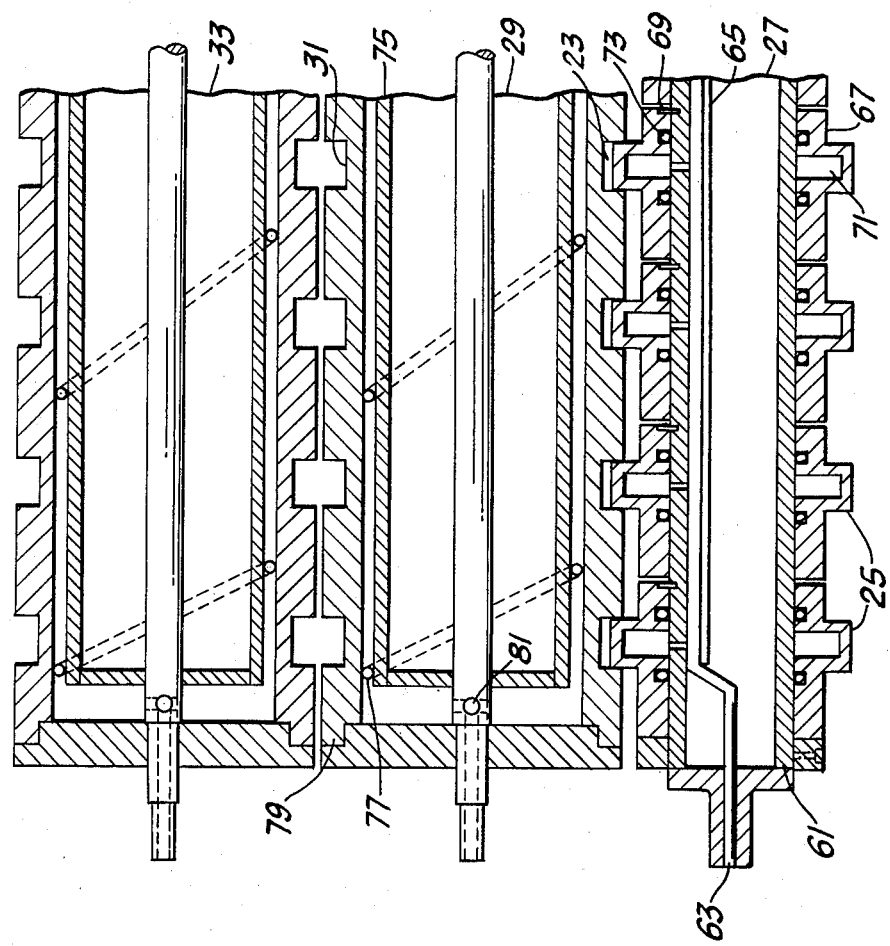
FIG. 3 is a partial cross-sectional view of one modification of the roll shaping arrangement of FIG. 1.

In considering the operation of the system shown in FIGS. 1 to 3 it is first pointed out that the cross-section of the die orifices need not conform either in size or shape with the size and shape of the sizing passages formed by the rolls. The extruder delivers the softened expandable thermoplastic material into the unconfined zone, 19, lying between the die orifices, 17, and the entrance openings of the confined passages, 23, or sizing passages. Because of the release of the pressure within the material at this point, the material in each extrudate partially expands and forms a mass or glob, 21, at the entrance of its sizing passage. As the intermeshing, internally cooled rolls, 27, and 29, rotate, each mass, 21, is passed into its sizing passage, 23. The cross-sectional size of the masses, 21, is greater than the cross-sectional size of the confined passages 23. As the partially expanded material enters the confined passage, the surface portions are immediately chilled by the cooled surfaces of the rolls, causing the surface portions of the formed extrudate to solidify. The internal pressure of each extrudate as it enters the confined passage is also increased, which helps to form the solid, structural skin on the formed extrudate. The material in the core portion of each extrudate continues its expansion as it is being conveyed through the sizing passage. The net effect in the sizing passage is that the surface layers are soldified in a substantially unexpanded state while the core expands to a porous foam core. The pressure developed by the expanding core serves to maintain the surfaces of the extrudate in contact with the surface of the confined passage, 23, and results in the extrudate being formed into the shape of the confined passage.

Since the formed extrudate is passed or conveyed through the confined passages by the moving rolls, in effect the sizing passages are moving at the same speed as the extrudates being formed. This eliminates the frictional forces which would have been encountered if the extrudates had been formed by pulling them through stationary dies.

The formed extrudates continue around roll 29, each confined in a rectangular groove, 31, whereby the surface next to the roll is further cooled. The formed strips are then transferred to the grooves, 35, in the roll, 33, whereby the opposite surface of the extrudate is further cooled. By adjusting the cooling rate imposed on the extrudate by roll 29 with respect to the rate of cooling by roll 33, warpage of the sized extrudates can be eliminated. The formed and cooled extrudates are then removed from roll 33, through nip rolls, not shown, to a cutting station, not shown, where the extrudates are cut into desired lengths.

The process described is especially useful for extruding a plurality of thin-section, rectangular cross-sectioned strands or ribbons which can be cut to lengths to be used as, for example, ice-cream sticks or tongue depressors. The addition of embossed patterns to the grooves, 31, or the projections, 25, imparts a duplicate embossment to the extrudate surface. Various shapes of extrudates can be produced which are useful as picture frames, or decorative veneers for the furniture or other wood working industries.

A die, suitable for the simultaneous extrusion of a plurality of streams of extrudate, is illustrated in FIG. 2. The die, 15, comprises a housing, 37, having an inlet, 39, which attaches to the extruder barrel to direct the flow of molten polymer from the barrel, through the plenum, 41, to the discharge port, 43. The discharge port is a slot-shaped opening formed by the slot lips, 45 and 47, such that the molten polymer would be extruded as a wide, thin sheet if no further modification of the die were present.

To divide the molten extrudate into a plurality of streams, the slot has mounted therein a number of adjustable flow divider inserts, 49, between the slot lips and spaced apart from one another such that a plurality of orifice openings, 17, are defined. Each orifice is bounded by the slot lips on the top and bottom, and by one divider insert on one side and another divider insert on the other side.

The design of the adjustable divider inserts is illustrated in FIG. 2a. Each insert, 49, consists of a flat, triangular shaped piece having a slot, 51, cut from the base of the triangle toward the apex and terminating in a circular point, 53, such that the two halves of the piece can be moved about the point 53. Each half of the piece contains a land, 55, which can be semicircular as shown in the FIG. 2a, or flat, or any desired configuration. One side of the dividers is rigidly fastened between the two slot lips by a bolt at 57. The other side of the dividers is fastened by means of a dual action cam bolt at 58. The cam bolt 59 has an unthreaded offset portion 60 (shown in FIG. 2b) on the end. The threaded portion of bolt 59 threads into the threaded hole in slot lip 45, while the unthreaded portion 60 extends into the slot 58 in the adjustable side of the divider 49. When the bolt 59 is turned in lip 45, the offset 60 causes the adjustable side of the divider to move about point 53 to open or close slot 51. The net effect is to close or open the gap 17 between the land of the adjustable side and the land of the rigidly fastened side of the adjacent divider. The adjustable side of the divider insert is machined to a lesser thickness than the rigidly fastened side. This allows the adjustable (thinner) side to move about the point, 53, when the cam bolt 59 actuates the flow divider half to the right or left thereby opening or closing the flow area in each orifice available to polymer flow. Thus, each orifice opening is bounded by the slot lips on top and bottom, the land on the fixed side of one divider insert on one side, and the land of the adjustable side of a second divider insert on the other side.

In operation, the molten polymer is forced from the barrel of the extruder into the inlet of the die housing. The polymer flows from the die inlet, through the plenum to the slot lips where the molten mass is divided into a plurality of streams by flowing out of the orifices between the divider inserts. Although only nine orifices are shown in FIG. 2, as many as 20 orifices have been successfully used in such a die.

If the amount of extrudate flowing from a given orifice is too great, the dual action cam bolt is turned in a direction to cause the adjustable side of the divider insert to move about pivot point 53 to close the gap between the adjustable land and the rigid land of the adjacent divider insert. If the amount of extrudate is too little, the cam bolt is turned in the opposite direction to cause the gap between the adjacent rigid land and the adjustable land to open wider. The effect of the individually adjustable flow divider inserts is to provide a controllable through-put of polymer from each of the orifices.

Although the die was designed specifically for the extrusion of multiple streams of foamable thermoplastic polymer for the production of foamed extrudate profiles, the die is applicable to the extrusion of any thermoplastic polymer and is not limited to the instant application.

The intermeshing sizing rolls, useful in the present invention, are described in detail in FIGS. 3, 3a, 4, and 4a. Since differential cooling of the rolls is necessary for the control of warpage of the foam profiles, it is desirable to be able to operate the cooling rolls at different temperatures. If the intermeshing rolls were of a solid construction, differential thermal expansions of the rolls would result in severe galling of the intermeshing surfaces.

FIG. 3 illustrates one embodiment of the invention whereby each roll can be operated at any desired temperature without damage to the roll surfaces. Roll 27 is comprised of a water cooled steel shell, 61, including a water distribution channel, 63, and a water collection channel, 65. Encompassing the steel shell are a plurality of bearing bronze rings, 67, which are individually located by a steel pin, 69. The function of the pin is to eliminate counter rotation of the bronze ring and the steel shell. Each bronze ring has provided a water channel, 71, and two O ring rubber seals, 73, to prevent water leakage. The water distribution channel, 63, water collection-channel, 65, and individual water channels, 71, form a closed loop cooling system for each bronze ring. Other cooling media, besides water, may be used if desired.

The bronze rings, 67, are self-aligning within the range of longitudinal thermal expansion of roll 29; i.e., if roll 29 is operated at a different temperature than roll 27, the bronze rings will slide in a longitudinal direction and remain aligned in the grooves, 31, provided in roll 29. Since the bronze rings remain aligned, the clearance between the intermeshing surfaces in kept at a mimimum to prevent polymer flash during the forming process.

Roll 29 and Roll 33 may be identical in construction. They consist of an interior steel shell, 75, which is spirally wrapped with lead tubing, 77. Over this subassembly is a second steel shell, 79, with grooves, 31, machined around its outer surface. The assembly of the two shells forms an internal spiral cooling passage where a cooling medium can be introduced by means of distribution nozzles, 81. The spiral flow passage assures rapid velocities of cooling medium which results in equal longitudinal and circumferential cooling of the roll.

Figure 4A:
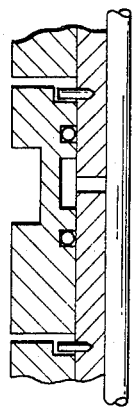
FIG. 4a is an enlarged section of one of the confined shaping passages of FIG. 4.
Figure 4:
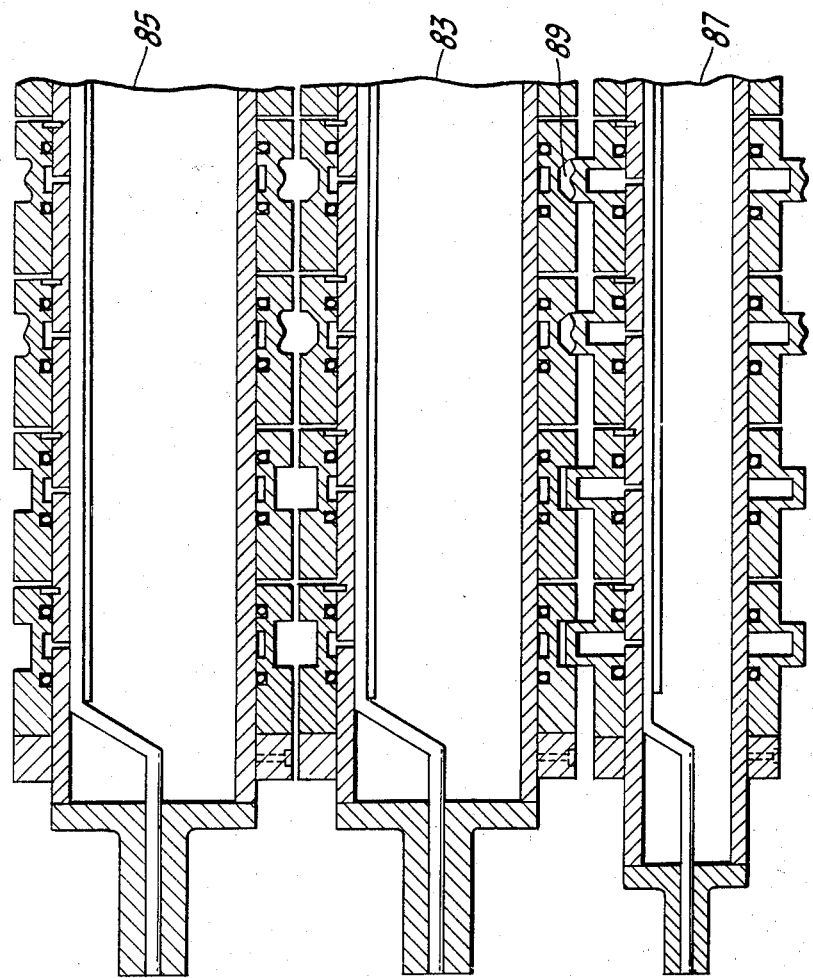
FIG. 4 is a partial cross-sectional view of a second modification of the roll shaping arrangement of FIG. 1.

In another embodiment, shown in FIG. 4, the rolls, 83 and 85, containing the grooves may be constructed using a water cooled shell encompassed by interchangeable bronze rings. The construction details are identical with that of roll 27 in FIG. 3 except that the interchangeable bronze rings contain grooves in place of the projections.

Besides facilitating alignment of the rolls, another advantage derived from the use of the interchangeable bronze ring construction in all of the rolls is that foam extrudates having different cross-sectional profiles can be formed simultaneously on the same equipment. The shape of the formed extrudate is dependent only on the shape of the moving forming passage and does not depend on the shape of the extruder die orifice. Thus, a portion of the rolls could be assembled using projections and grooves for forming flat, rectangular cross-sections, such as shown in FIG. 3, while another portion of the rolls could be combined to form the cove-molding illustrated in FIG. 4, at 89. The number of varying cross-sectional profiles produceable on a single setup could thus be limited only by the width of the rolls and the practical size of the equipment.

The result would be the capability of simultaneously making a plurality of extrudates having a multiplicity of profiles from the same thermoplastic material. The greater flexibility and economy afforded by the use of interchangeable brass rings over the need to produce several large permanent rolls, each with its own projection and groove shape makes this modification of the invention a preferred modification.

Materials for use in the practice of this invention can be any expandable thermoplastic material. Examples of thermoplastic materials that can be used are: homopolymers and copolymers of vinyl aromatic compounds such as polystyrene, polyvinyl toluene, homopolymers of alpha-methylstyrene and 2,5-dichlorostyrene, acrylonitrile-butadiene-styrene copolymers and styrene-butadiene copolymers; polyamides such as polyhexamethyleneadipamide (nylon 6/6), polycaprolactam (nylon 6) and polyamides prepared by reacting hexamethylene diamine with sebacic acid; polymers prepared from the monoolefins such as polyethylene, polypropylene, polybutylene and polyisobutylene; vinyl polymers such as polyvinyl chloride, acetate and polyvinylidene chloride; polyacrylics such as polyacrylic acid, polymethyl methacrylate, acrylonitrile-butadiene copolymers; vinyl others such as polyvinyl methyl ether; cellulose esters such as cellulose acetate, cellulose butyrate and cellulose propionate, or mixtures thereof.

The material is made expandable by the use of an expanding agent which will produce voids or bubbles in the material as the pressure on the material is reduced when the material exits from the extruder into the free space provided before the material reaches the sizing passage, and foaming or expanding continues in the interior of the extrudate while the external shell is solidified in the sizing passage. Expanding agents which will effect such expansion include many which have heretofore been used in various other techniques for making expanded polymer articles. Exemplary classes of expanding agents that can be used are: normally gaseous materials; normally liquid materials which volatize readily; and normally solid materials which upon reaction or decomposition, usually effected by heating, evolve a gas as one of the decomposition or reaction products. The expanding agent and the amount used for any particular application will be governed generally by the specific polymer that is being foamed and molded and by the extent and type of foaming that is desired in the product.

Examples of normally gaseous materials which can be combined with the foamable polymer under pressure and which are capable of foaming the polymer as the pressure is reduced include nitrogen, carbon dioxide, lower molecular weight paraffins such as propane and butane, methylchloride, lower molecular weight olefins such as ethylene, propylene, and butylene or mixtures of the above. Gaseous materials of this type can be injected directly into the thermoplastic material in the extruder used.

Examples of normally liquid materials which under the influence of heat volatalize at temperatures near those at which the polymer is rendered soft and flowable include: liquid fluorocarbons such as 1,2-dichlorotetrafluoroethane; methylchloride; paraffins such as pentane and hexane, and other relatively low boiling hydrocarbons, or mixtures thereof. Upon heating a mixture of the expandable polymer and normally liquid blowing agent, the liquid volatalizes and the resulting gas effects foaming of the polymer as pressure on the polymer is reduced. Such liquid blowing agents can be combined with the polymer according to available techniques. For example, polymer particles can be coated or impregnated with the liquid blowing agent or the liquid blowing agent can be incorporated into the polymerization reaction mixture from which the polymer is produced therby providing polymer particles having integrated therein the blowing agent.

Examples of normally solid materials which decompose to evolve a gas include azodicarbonamide, 1,1'-azobisformamide, dinitroisopentamethylenetetramine, barium azodicarbonate and ammonium and potassium bicarbonate. Materials which react to liberate a gas include, for example, the combination of an alkali or alkaline earth carbonate or bicarbonate, for example, sodium bicarbonate, and an organic acid such as citric acid; a reaction product of these materials is carbon dioxide gas which effects expansion of the polymer. Such normally solid materials which evolve a gaseous expanding agent can be dry blended readily with particles or beads of the polymer.

The amount of expanding agent that can be incorporated in the expandable polymer can vary over a wide range, for example, from about 0.3 to about 15 wt %.

As mentioned above, the amount of expanding agent used will be determined generally by the specific expanding agent used, the specific polymer being foamed and the extent and type of foaming that is desired in the product.

For preparing foamed articles such as boards, rods, ribbons, or other profiles or structural shapes, it is preferred to use polymers of styrene including homopolymers of styrene, copolymers of styrene and modified polystyrenes.

Some examples of preferred expandable polymers of styrene for use in the practice of this invention are as follows. One type or preferred expanding styrene polymer (described in U.S. Pat. No. 2,983,692) is prepared by adding to the aqueous suspension polymerization reaction mixture from which the polymer is made a normally liquid blowing agent such as a petroleum ether, certain ligroines, pentane and hexane. The reaction product comprises polymeric particles or beads which have intergrated therewith the blowing agent. The blowing agent selected for use with any particular polymer should be volatile and boil somewhat below the incipient softening point of the polymer. Such blowing agents can have a boiling point within the range of about 30°C. to about 100°C., preferably about 35°C. to about 65°C., and can be added to the reaction mixture in amounts from about 5 to about 30 parts per 100 parts of the expandable polymeric particles or beads produced. Upon heating the particles to their incipient softening point or higher, the blowing agent volatizes and the discrete polymeric particles coalesce to form a cellular polymeric structure. Examples of expandable styrene polymers that can be prepared in this manner include: polystyrene, a homopolymer of dimethylstyrene, styrene-butadiene copolymer, a copolymer of styrene and alphamethyl styrene, a terpolymer of styrene, butadiene and alpha-methyl styrene, a copolymer of styrene and isobutylene, a copolymer of styrene and dimethyl styrene, and impact polystyrene which is an admixture of polystyrene with an elastomer such as, for example a styrene-butadiene copolymer.

Another preferred expandable styrene polymer that can be used in the practice of this invention comprises polystyrene particles or beads having integrated therewith a normally liquid blowing agent and a carbon dioxide liberating agent, for example a mixture of an alkali or alkaline earth carbonate or bicarbonate and an organic acid. The normally liquid blowing agent, having a boiling point of about 30°C. to about 90°C., can be incorporated in the polystyrene by adding it to the aqueous suspension polymerization reaction mixture from which the polystyrene is prepared in amounts of about 4.5 to about 9%. The carbon dioxide liberating agent can thereafter be admixed with the resulting polystyrene particles or beads in amounts sufficient to produce upon reaction a total of about 0.1 to about 5 wt %, based on the expandable beads, of water and carbon dioxide. The organic acid should have at least about 3.0 milli-equivalents of acidic hydrogen per gram. Examples of acids which can be used are citric acid, diglycollic acid, tartaric acid and succinic acid. Expandable polystyrenes of this type can be used to produce foamed or cellular articles having relatively smaller and more uniformly sized voids or cells. Such expandable resins are described in U.S. Pat. No. 2,941,964.

The same type of expandable polymer as described immediately above can be prepared by an alternative method, as described in U.S. Pat. No. Re. 26,278. A mixture of two types of polystyrene particles, one type comprising the polystyrene having the organic acid incorporated therein and the other comprising the polystyrene with the carbonate or bicarbonate incorporated therein. A noramlly liquid blowing agent can be incorporated into one or both types of the resin particles.

Another type of expandable polymer (described in U.S. Pat. No. 3,457,205) that can be used in practice of this invention is one which comprises expandable polystyrene beads, a non-expandable thermoplastic polymer powder and a hydrate containing at least 25% by weight of chemically bound water, such as, for example, hydrates of cupric sulfate, ferrous sulfate and sodium carbonate, This type of composition, upon being extruded and advanced through the sizing passage produces an article, the skin or outer layer of which is comprised of the non-expandable thermoplastic polymer. In this manner, foamed articles with a relatively integral protective coating can be produced. This type of polymer can comprise expandable polystyrene beads, about 0.33 to about 3 parts by weight of the non-expandable thermoplastic polymer powder and about 3 to 40% by weight of the hydrate. Examples of the non-expandable thermoplastic polymer that can be used include polyethylene, ethylene-vinyl acetate copolymer, polystyrene, polyvinyl chloride, polyamides and polyacrylates.

For preparing the thin-section structural foam articles, such as ice-cream sticks or tongue depressors, a highly preferred thermoplastic material is a blend of the following composition:

a. about 5% by weight of expandable polystyrene beads containing about 6.5 to 7.0% by weight of n-pentane, about 0.1–0.5% by weight of citric acid, and up to 0.4% by weight of sodium carbonate;

b. about 85% by weight of unmodified polystyrene; and c. about 10% by weight of impact polystyrene comprising a graft polymer of styrene on polybutadiene or a blend of polystyrene eand polybutadiene wherein the polybutadiene content of the graft polymer can comprise 1.5–7.5% by weight.

Such polymers can be used to produce foam products having a density within the range of about 20 to about 60 pounds per cubic foot, depending on the temperature of the extrudate, the cooling applied and the speed of the sizing rolls, which affects the amount of time that the extrudate has to expand.

Some modifications can be made to the above foamable composition to achieve certain desired properties in the foamed profile. For example, the impace polystyrene can be replaced by low density or high density polyethylene or by an acrylonitrile-butadiene-styrene resin or by a general purpose polystyrene. Also the expandable polystyrene of the above-described composition or the aforementioned modified compositions can be replaced with about 1 to about 10 wt. % of a normally solid blowing agent which decomposes to evolve a gas. Examples of such agents include p,p'oxybis(benzenesulfonyl hydrazide), azo-bis-butyronitrile, azodicarbonamide and carbonate esters used in combination with an activator to promote the release of gas, for example, sodium carbonate and succinyl mono glycerin carbonate.

Other materials or additives generally incorporated into expandable compositions can be included in the foamable thermoplastic compositions which are expanded and foamed according to the method of the present invention. Examples of such additives include heat and light stablizers, antioxidants and lubricants. Coloring agents such as pigments and dyes can be added also to the expandable composition for the purpose of producing colored and decorative articles. Conventional amounts of such additives and agents can be used.

Fillers can be added also to the foamable thermoplastic compositions. Examples of fillers include calcium carbonate, fibrous reinforcements such as glass fibers, cellulose and asbestos fibers. The fillers can be used in conventional amounts, according to the desired characteristics of the finished product.

What is claimed is:

1. An extrusion die for producing a plurality of streams of extrudate comprising a housing having an inlet and a discharge port and a plenum connecting said inlet and discharge port, said discharge port being a slot-like, horizontally disposed opening having mounted therein a plurality of flow-divider means for dividing said slot into a plurality of orifices, each of said divider means having a fixed side and an adjustable side, said adjustable side being laterally adjustable in relation to the fixed side of an adjacent divider means to control the size of the orifices.

2. The die of claim 1 wherein said divider means consists of a flat, triangular shaped piece divided into two halves by a slot cut from the base of the triangle toward the apex, said slot terminating in a circular point such that the two halves of the piece are united above the point but can be moved laterally about point; each half having land portion extending from the base of the triangle away from said apex; said one half being capable of being rigidly fastened between the slot-like opening of the discharge port while the other half is laterally adjustable about the circular point by means of a dual action cam bolt.

* * * * *